United States Patent [19]

McNinch

[11] 4,359,804
[45] Nov. 23, 1982

[54] LOAD SUPPORTING HINGE STRUCTURE WITH CONCEALED ANGULAR BEARING

[75] Inventor: Delmar McNinch, Rock Falls, Ill.

[73] Assignee: Lawrence Brothers, Inc., Sterling, Ill.

[21] Appl. No.: 970,556

[22] Filed: Dec. 18, 1978

[51] Int. Cl.³ .............................................. E05D 11/14
[52] U.S. Cl. ....................................... 16/276; 308/174
[58] Field of Search ................... 16/21, 136, DIG. 27, 16/139, 276; 308/230, 189 R, 188, 175, 174

[56] References Cited

U.S. PATENT DOCUMENTS

| | | | |
|---|---|---|---|
| 1,931,871 | 10/1933 | Large | |
| 1,948,105 | 2/1934 | Ford | 308/189 R |
| 1,998,735 | 4/1935 | Rasmussen | 308/189 R |
| 2,232,473 | 2/1941 | Pulleyblank | 308/189 R |
| 2,512,941 | 6/1950 | Johnson | 16/21 X |
| 3,118,171 | 1/1964 | Parsons | |
| 3,465,380 | 9/1969 | Foltz | 16/136 |
| 4,097,959 | 7/1978 | Johnson | 16/139 X |

FOREIGN PATENT DOCUMENTS

| | | | |
|---|---|---|---|
| 1169211 | 4/1964 | Fed. Rep. of Germany | 308/230 |
| 1259148 | 1/1968 | Fed. Rep. of Germany | 308/230 |
| 26141 | of 1903 | United Kingdom . | |
| 1139680 | 6/1973 | United Kingdom . | |

Primary Examiner—Andrew V. Kundrat
Attorney, Agent, or Firm—Trexler, Bushnell & Wolters, Ltd.

[57] ABSTRACT

There is disclosed an improved load supporting hinge structure which includes concealed bearing units, disposed within an intermediate knuckle of one of the hinge leaves and adjacent to the spaced end knuckles of the other one of the hinge leaves to afford both the desired support and smooth operation thereof. Each of the bearing units includes a first, generally annular, race member defining a first raceway and having a central aperture, a second, generally annular race member defining a second raceway and having an axial extension which engages the hinge pintle and extends axially therealong through the first race member aperture to provide non-bending support for the pintle.

7 Claims, 4 Drawing Figures

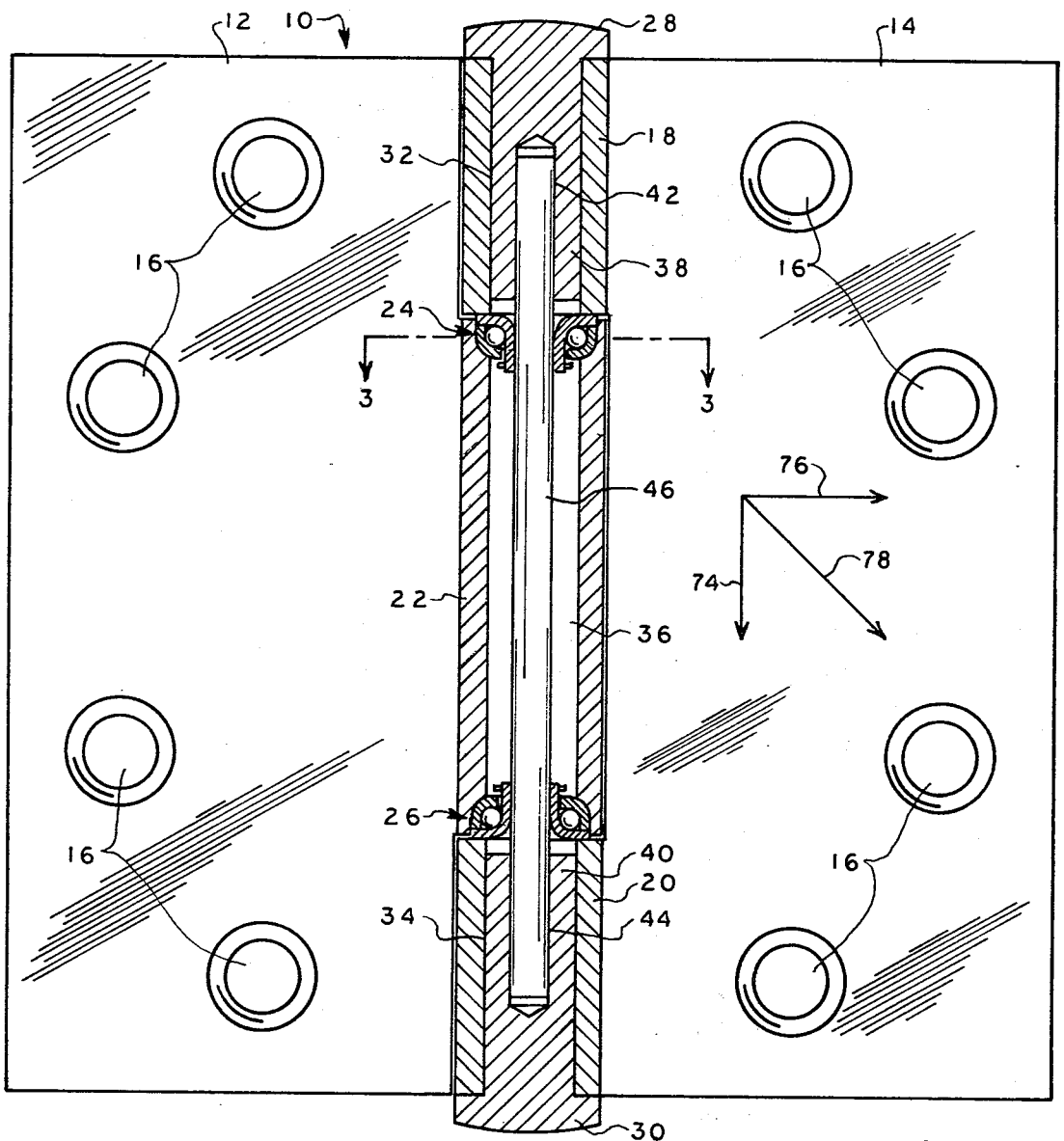
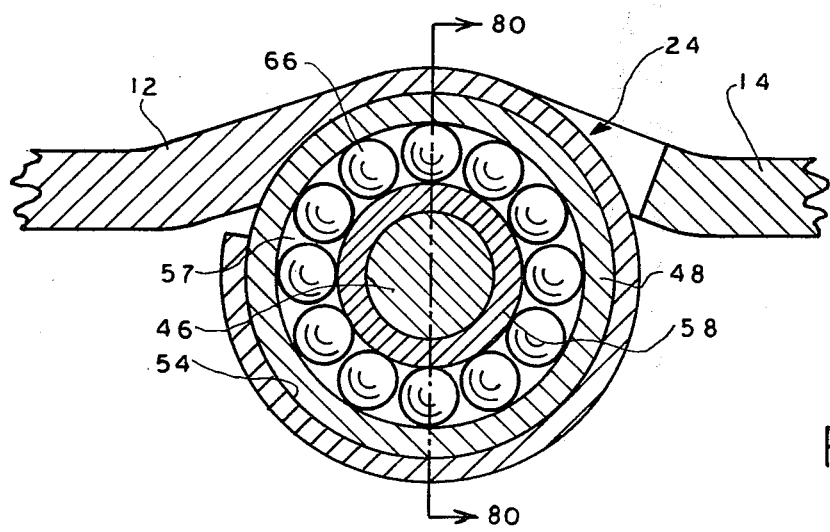
FIG. 1
FIG. 3

LOAD SUPPORTING HINGE STRUCTURE WITH CONCEALED ANGULAR BEARING

BACKGROUND OF THE INVENTION

The present invention relates generally to hinges and more particularly to a hinge structure which includes bearing units, such as ball-bearing units located between adjacent knuckles of the hinge leaves to provide for both smooth operation and load support.

On residential and commercial buildings, doors are conveniently hung for swinging operation about a vertical axis of butt hinges or the like. The size and the weight of such doors often tends to exert a considerable axial load or force component on the hinges as well as a horizontal or radial load component. If a conventional butt hinge is used, the results of these radial and axial loads is the creation of considerable friction between the adjacent engaged surfaces of the knuckles of the hinge, as well as between those portions of the knuckle bores which are in contact with the hinge pin or pintle. This friction hampers smooth operation and also produces wear. Applying grease or oil to these areas of contact may help to reduce the wear on the adjacent parts on a relatively small or light door, but is of little use in the case of a relatively large or heavy door, or a door which is subject to frequent opening and closing about the hinges.

It is also known in the art to use bearing units or the like disposed between the adjacent knuckles of a hinge to accommodate the axial or vertical load or force component, but the bearing units in use fail to accommodate the radial or horizontal component of force or load and were ineffective where heavy doors were being used. To overcome this problem of horizontal load, spacing and support bushings disposed between the knuckle bores and the pintle have been used. These also proved unsatisfactory for all situations as friction and resultant wear continued to occur in the areas where such bushings engage and rotate against surfaces of either the pintle or the knuckle bores.

The next step in the art was to employ bearing units which could accommodate to certain degrees both radial and axial loading. Two examples of this type of hinge can be found in U.S. Pat. Nos. 3,465,380 and 3,118,171. These designs while more effective than the prior construction still were subject to inherent problems. In this regard at least one race member included an annular groove defining both inner and outer peripheral shoulders which fix the relative radial position of the ball bearing elements. While the arrangement did not effect the ability of the bearing units to accommodate axial loads, performance under heavy radial or horizontal loading was not always satisfactory.

More specifically, with the above-discussed arrangement relative movement between the respective race members and the bearing units is restricted by the fixed orientation of the ball bearing in the groove. Accordingly, when radial load is applied, the ball bearings which accommodate the load are not loaded uniformly, that is to say that when a radial load is encountered only one-half of the ball units will accommodate the load while an axial or thrust force will load all of the bearing elements. Thus, due to the use of the groove for the balls and the lack of relative movement, these bearing elements which are not accommodating the vertical load directly will be forced into engagement with one of the groove shoulders. This tends to produce wear, unwanted noise and hamper smooth operation of the hinge.

To overcome the above-mentioned disadvantages of prior art hinge structures, a further hinge structure as fully described and claimed in U.S. Pat. No. 4,097,959, which issued on July 4, 1978, to the assignee of the present invention, was developed. The hinge structure of that invention included ball-bearing units having an axially outer and an axially inner race members and a train of bearing members mounted for movement therebetween. The respective race members are so constructed that the bearing unit can accommodate both vertical and horizontal loads, with uniform loading of the load supporting bearing elements being attained by provision of slight relative movement between the race members and the bearing elements. The present invention is an improvement over the design of said patent, the disclosure of which is incorporated herein by reference. As such, the present invention affords not only benefits from the above-mentioned type of operation, but in addition, includes bearing units which are concealed within the hinge knuckles for aesthetic purposes and to protect the bearing units from the collection of dirt and other deleterious substances. The employment of a concealed bearing necessitates the use of a pintle which is of a relatively small diameter, and the present invention accommodates this by providing an axial extension on each bearing unit to lend non-bending support to the hinge pintle.

SUMMARY OF THE INVENTION

The present invention provides a hinge structure for mounting a door to a door jamb, or the like, comprising a pair of hinge leaves, one of the pair of leaves including at least a pair of spaced end knuckles, the other of the pair of leaves including at least one intermediate knuckle, wherein the knuckles each include a central axis bore and wherein the bores are aligned coaxially upon assembly. The hinge structure also includes pintle means disposed in the bores to maintain the leaves in assembled relation. Bearing means of a novel design are disposed between the intermediate knuckle or knuckles and each of the adjacent end knuckles. The bearing means is in the form of an assembly which comprises a first, generally annular, race member including a central aperture of larger diameter than the pintle means and a radially inner arcuate surface defining a first raceway, and a second, generally annular, race member including a central aperture sized to be engaged with the pintle means so as to join the pintle member and second race member for joint rotation. The second race member has a radially outer arcuate surface juxtaposed to the first race member radially inner arcuate surface defining a second raceway. In addition the second race member includes an inner portion engaged with the pintle member for lending non-bending support to said member. The bearing units also include a plurality of bearing elements disposed between the first and second raceways and means maintaining the raceways and bearing elements in assembly. The design is such that the length of said inner portion can be selected to provide the desired degree of support to said pintle member.

The foregoing, as well as other objects and advantages of the present invention will become apparent from a consideration of the following description taken with the accompanying drawing wherein like reference numerals are used throughout to designate similar elements and components.

BRIEF DESCRIPTION OF THE DRAWINGS

FIG. 1 is an enlarged front elevation view of a hinge in accordance with the present invention, with the hinge barrel and portions of the bearing elements partially in section;

FIG. 3 is a partial sectional view taken generally along lines 3—3 of FIG. 1.

DETAILED DESCRIPTION OF THE INVENTION

Figure 2:
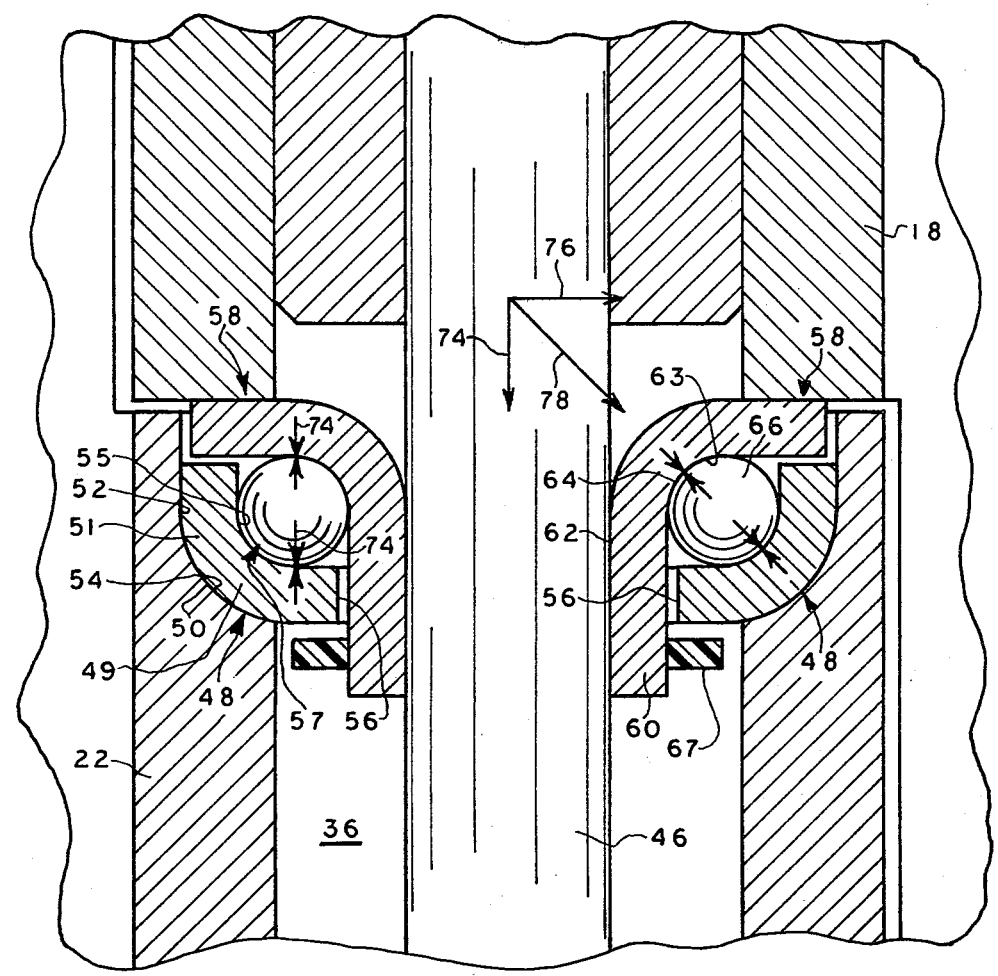
FIG. 2 is an enlarged view of the upper bearing portion of the hinge as shown in FIG. 1.

Referring now to FIG. 1, the hinge structure 10 as shown includes a pair of relatively planar leaves 12 and 14 including means, such as openings 16, for mounting the leaves to a door and a jamb (not shown), respectively. The leaf 14 is provided with a pair of spaced, generally tubular end knuckles 18 and 20. Similarly, leaf 14 is provided with a generally tubular intermediate knuckle 22, medially disposed with respect to the end knuckles 18 and 20. Bearing means or units 24 and 26 are disposed within the intermediate knuckle 22 at respective ends thereof and adjacent to each of the end knuckles 18 and 20 respectively. End caps 28 and 30 are attached to end knuckles 18 and 20, respectively, in a manner to be described in detail below. While the end caps 28 and 30 are of the "button" type with the head portions thereof exposed, flush type end caps could be employed. While the invention is illustrated and will be described with respect to a hinge having three knuckles, it should be understood that the invention is not limited thereto, but may be employed in hinges of other types, for example, those having five knuckles, or as a bearing unit for a two knuckle hinge.

Turning now to additional details of the hinge structure illustrated in FIG. 1, the end knuckles 18 and 20 and the intermediate knuckle 22 include axial bores 32, 34, and 36, respectively, which are of substantially equal diameter, and, in the assembled condition, are aligned substantiall coaxially. End caps 28 and 30 which include generally cylindrical portions 38 and 40, respectively, are engaged in the bores 32 and 34 of the end knuckles 18 and 20 for rotation in unison therewith. The cylindrical portions 38 and 40 are provided with central bores 42 and 44, respectively, and a pin or pintle member 46 extends axially between the end cap members 28 and 30 with its opposite ends engaged in the bores 42 and 44 for rotation in unison therewith. The pintle 46 in conjunction with the end caps 28 and 30 serve to maintain the hinge elements in the assembled condition. It will be noted that the diameter of pin or pintle 46 is substantially less than that of the bore 36 of the intermediate knuckle 22, which is necessitated by the employment of the concealed bearing units 24 and 26.

Referring now to FIGS. 2 and 3 wherein the bearing units 24 and 26 are illustrated in detail, it will be noted, in conjunction with the illustration of FIG. 1, that the bearing units 24 and 26 are of identical construction, and symmetrically disposed. Therefore, only the bearing unit 24 will be described in detail, it being understood that the unit 26 is of similar construction and operation.

The bearing unit 24 includes a first, annular, race member 48 which includes a portion 49 that is generally arcuate in cross-section. The race member 48 has a radially outer curved surface 50 which defines the outer periphery of the bearing unit 24. The intermediate knuckle 22 includes an enlarged inner diameter portion or counterbore 52 communicating with the bore 36 and has a correspondingly shaped radially inner curved surface 54 upon which the race member 48 may be seated, the counterbore if desired, may be of a conventional square bottom. If desired, the first race member 48 may be engaged with an interference fit within the intermediate knuckle 22. The race member 48 further includes a radially inwardly facing surface 55 which is generally arcuate in the area of portion 49, and serves to provide a first bearing raceway 57. In addition to the arcuate portion 49, the race member 48 includes a generally axially extending flange-like portion 51 defining the outer periphery thereof. The inner periphery of the race member 48 is free from any flange-like structure of the type which might confine the bearing members, and may be described as being generally flat, which flat portion thereof terminates to define a central aperture 56. As is shown, the central aperture is of a diameter sufficiently large to permit the pintle 46 to pass therethrough, so that the first race member 48 may rotate relative to said pintle.

The bearing unit 24 also includes a second, annular race member 58 also being of a generally arcuate configuration in cross-section. The second race member 58 includes a radially outer or outwardly facing surface 63 which defines a second raceway 64. The race second member 58 is devoid of any axially extending flange portion about its outer periphery such as might confine the bearing member, whereby the surface 63 terminates outwardly in a substantially flat portion. The radially inner portion of the race member 58 is by an axially extending annular flange or extension 60 which serves to define a central bore 62 for said second race member 58. The bore 62 is sized to receive the pintle 46 with a close fit, for a purpose to be discussed in greater detail hereinafter.

Intermediate the respective raceways 57 and 64 there is disposed a plurality of bearing elements such as ball bearings 66. In the illustrated embodiments, the axial extension 60 of race member 58 extends through the central aperture 56 of the first race member 48 and axially along the pintle 46, as previously described, and terminates at an end spaced from the central aperture 56. To hold the raceways and bearing elements in assembly, a retaining ring 67 is provided and disposed on the axial extension 60 intermediate the terminating end of the axial extension 60 and the central aperture 56 of race member 48.

It will be appreciated that the bearing unit 26, which is disposed within the intermediate knuckle 22 and adjacent to end knuckle 20 is of the same construction as bearing unit 24 and is disposed symmetrically with bearing unit 24 with respect to the other components of the hinge structure 10. Thus, the axial and radial relationsip among the various elements stated above with respect to bearing unit 24 are equally applicable to bearing unit 26.

As can also be appreciated from the foregoing, because the axial extension 60 extends axially through the central aperture 56 of race member 48, and along the pintle 46, it is in direct engagement with said pintle over a considerable expanse. As such the pintle 46 is provided with non-bending support at each of the bearing units 24 and 26.

The radial support afforded the pintle 46 by the axial extensions 60 is extremely important, as is discussed in greater detail hereinafter. In this regard, it will be recalled that the employment of concealed bearing units 24 and 26 limit the size of the pintle, viz., its diameter, relative to the overall hinge size. Further, when the hinge 10 is used to hang or mount a heavy door considerable bending movement or loading is placed on the pintle 46. Thus, due to the limited size of the pintle 46 it is extremely desirable to provide radial support against this bending movement to prevent deformation of the pintle 46. Should the pintle 46 become deformed, the operation of the hinge would be adversely effected.

Referring again to the hinge structure 10 of FIG. 1, the leaf 14 may be attached to a door (not shown), which is hung on a door jamb (not shown), by leaf 12 being attached to the door jamb. The door exerts on the hinge structure 10 both a vertical or axial force component in a direction indicated by arrow 74, as well as a horizontal or radial force component, in a direction indicated by arrow 76, which produces the bending movement referred to above. Thus, the resultant or actual force exerted by the door becomes an "angular" force as indicated by the arrow 78. These forces must be accommodated by the bearing units 24 and 26 in order to prevent wear and provide smooth, trouble-free operation. Of course, the heavier the door, the more severe the problem.

Looking now at FIG. 2, and the bearing unit 24 shown therein, the knuckle 18 is an integral part of the leaf 14 attached to the door and, therefore, transmits the aforementioned vertical or axial force component 74 as a thrust load to the bearing unit 24, upon which the knuckle 18 rests. Similarly, the knuckle 18 transmits the horizontal or radial force component 76 to the end cap member 28 and pintle 46 engaged therein. The pintle 46 in turn transmits the radial force to race member 58 by virtue of the snug fit between the pintle 46 and the race member 58. Thus, the resultant force 78 is transmitted by race member 58 and axial extension 60 thereof to raceway 64 defined thereby and thence to the ball bearings 66. While the vertical load 74 is accommodated by all of the balls 66, it should be noted that the horizontal force component 76 is accommodated by only those ball bearings 66 located in the right half of the bearing unit 24 as viewed and as indicated by the section line 80—80 of FIG. 3. In this regard, with reference to FIGS. 2 and 3, it can be seen that the radial force component 76 tends to separate the raceways 56 and 64 from the balls 66 in the left half portion. Thus, the force 78 imposed upon the hinge structure 10 by the door is carried primarily by the ball bearings 66, with the pintle 46 being subjected to a bending movement or loading along the unsupported length thereof.

More specifically with regard to the pintle 46, and assuming that the leaf 14 is affixed to the door, there is applied at any time a loading tending to bend said pintle 46 in the plane of the leaf 14 about the lowermost point of support of said pintle, i.e. bearing 26. The ability of the pintle 46 to withstand this bending movement without undergoing permanent deformation is dependent upon the size or diameter of the pintle, and the length of the movement arm, viz., the unsupported length between the lowermost fixed point (bearing 26) and the uppermost point (bearing 24) of application of the horizontal load 76. Since the diameter of the pintle 46 is limited due to the concealment of the bearings 24 and 26 within the intermediate knuckle 22, it is essentially that the pintle 46 be supported along its length to reduce the effective movement arm. With the novel bearing design as above described, the extension 60 can be sized to provide the desired support for the pintle 46, whereas the prior art hinge design had to resort to separate radial support sleeves to achieve this end.

It will also be apparent that the ball bearings 66 are substantially the only portions of the hinge structure 10 which move relative to adjacent touching parts, specifically, the raceway members, therefore, friction between moving parts and the hinge structure 10 is virtually eliminated except with respect to the bearing units 24 and 26 which are especially adapted to carry the loading forces and minimize friction.

Most importantly, due to the design of the race members 48 and 58, and more specifically, the elimination of an inner flange from the first raceway 57, and the absence of an outer peripheral flange on the second raceway 63, the balls 66 are not maintained captive with respect to either race member, consistent with the hinge structure described in the aforementioned U.S. Pat. No. 4,097,959, the disclosure of which is incorporated by reference herein. Accordingly, the respective elements, i.e. ball 66 and race members 48 and 58 are free to move relative to each other to accommodate and adjust to the angular load 78, regardless of its vector of application. This feature, in conjunction with the radial support afforded the pintle 46 by the bearing design of the present invention affords a feature not heretofore achieved with concealed bearing hinges, and is thus an improvement thereover.

Thus, through the provision of the hinge structure 10, including bearing units 24 and 26, according to the invention, a door hung thereby is properly supported so that it will operate smoothly and easily while avoiding bending to the pintle or wear due to friction to the pintle, knuckles, and other elements thereof.

Figure 4:
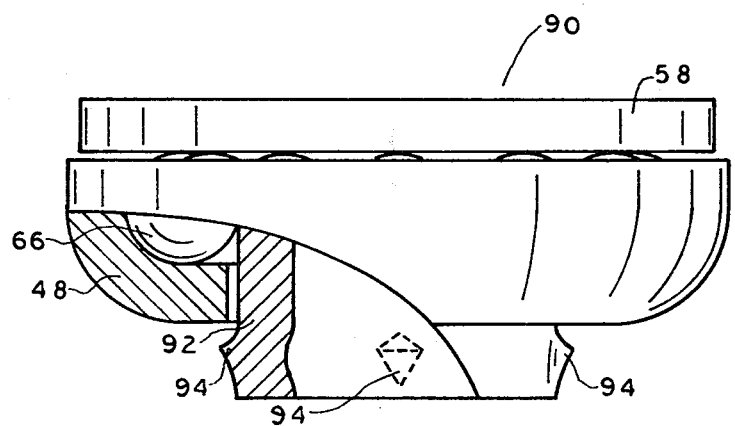
FIG. 4 is an enlarged front elevation view, partially in section, illustrating an alternate form of bearing unit embodying the present invention.

Referring now to FIG. 4, there is shown a bearing unit 90 substantially identical to bearing units 24 and 26 previously described, but wherein the flange means maintaining the raceways and bearing elements in assembly is integral to the axial extension. More specifically, it can be seen that the axial extension 92 of the bearing unit 90 includes a plurality of protuberances 94 which are radially disposed and integrally formed on the axial extension 92. The protuberances 94 may be formed in any well known manner such as by coining or the like. As in the case of the retaining ring 49, the protuberances 94 will maintain the first race member 48, the second race member 58, and the ball bearings 66 disposed between the respective raceways of race members 48 and 58 in assembled condition.

While particular embodiments of the present invention have been shown and described, various changes and modifications may occur to those skilled in the art, and are to be understood as forming a part of this invention insofar as they fall within the spirit and scope of the claims appended hereto.

The invention is claimed as follows:

1. A hinge structure for mounting a door to a door jamb, or the like, comprising: a pair of hinge leaves, one of said pair of leaves including at least a pair of spaced end knuckles, the other of said pair of leaves including at least one intermediate knuckle, said knuckles each including a center axial bore, said bores being aligned coaxially upon assembly; pintle means disposed in said bores to maintain said leaves in assembled relation; and at least one bearing means disposed adjacent to one of said end knuckles, said bearing means comprising a first, generally annular, race member including a central aperture of larger diameter than said pintle means and a radially inner arcuate surface defining a first raceway, a second generally annular, race member including a central aperture sized to be engaged with said pintle, means so as to join said pintle member and second race member for joint rotation, said second race member having a radially outer arcuate surface juxtaposed to said first race member radially inner arcuate surface defining a second raceway, said second race member further including an axial extension extending through the central aperture of said first race member and engaging said pintle means for lending nonbending support to said pintle means, a plurality of bearing elements disposed between said first and second raceways, said axial extension terminating at an end spaced from said first race member central aperture, and means maintaining said raceways and bearing elements in assembly, said means including protuberance means extending radially from said axial extension and disposed intermediate said first race member central aperture and said axial extension terminating end, said protuberance means comprising a plurality of integral projections formed in said second race member axial extension.

2. In a ball bearing hinge structure for mounting a door to a door jamb, or the like, wherein the bearing means is not visable in the assembled condition, comprising: a pair of hinge leaves, one of said pair of leaves including at least a pair of spaced end knuckles, the other of said pair of leaves including at least one intermediate knuckle, said knuckles each including a central axial bore, and pintle means disposed in said bores to maintain said leaves in assembled relation; said at least one intermediate knuckle, adjacent the end thereof opposite the upper end knuckle, including a counter bore, and a bearing means disposed within said counter bore for accommodating both horizonal and vertical loads at the same time such that in the assembled condition of said hinge, said bearing means is received within said bore and concealed from view, the improvement wherein said bearing means comprises, a first radially outer race member having a radially outer surface in engagement with said counter bore, and a radially inner surface of an arcuate configuration defining a first bearing raceway and terminating at its radially inner periphery in a substantially flat portion free of any shoulder means and which defines a central aperture for said first race member of larger diameter than said pintle, and a second radially inner race member having an axially extending portion and a radially extending portion which provide a radially outer surface of an arcuate configuration to define a second bearing raceway in facing relation to said first bearing raceway, a plurality of ball bearing elements disposed between said first and second arcuate raceways, said axially extending portion of said second race member defining the central aperture for said second race member, which axially extending portion closely receives said pintle to lend nonbending support thereto, and extends through the central aperture of said first race member, and said radially extending portion being substantially flat and free of shoulder means and providing a radially extending annular surface against which the end knuckle is engaged in supporting relation, and means on said axially extending portion of said second race member for maintaining said bearing means in assembly.

3. A hinge structure according to claim 2, wherein a counter bore and bearing means are provided adjacent each of said spaced end knuckles.

4. In a ball bearing hinge structure for mounting a door to a door jamb, or the like, wherein the bearing means is not visable in the assembled condition, comprising: a pair of hinge leaves, one of said pair of leaves including at least a pair of spaced end knuckles, the other of said pair of leaves including at least one intermediate knuckle, said knuckles each including a central axis bore, and pintle means disposed in said bores to maintain said leaves in assembled relation; said at least one intermediate knuckle, adjacent the end thereof opposite the upper end knuckle, including a counter bore, having a radially inner curved surface and a bearing means disposed within said counter bore for accommodating both horizontal and vertical loads at the same time such that in the assembled condition of said hinge, said bearing means is received within said bore and concealed from view, said bearing means comprising, a first radially outer race member engaged in said counter bore and, having a radially outer curved surface corresponding in shape to the radially inner curved surface of said counter bore, and said first race member further including a radially inner surface portion of an arcuate configuration defining a first bearing raceway and terminating at its radially inner periphery in a substantially flat portion free of any shoulder means and which defines a central aperture for said first race member of larger diameter than said pintle, and a second radially inner race member having an axially extending portion and a radially extending portion which provide a radially outer surface portion of an arcuate configuration to define a second bearing raceway, in facing relation to said first bearing raceway, a plurality of ball bearing elements disposed between said first and second arcuate raceways, said axially extending portion of said second race member defining the central aperture for said second race member, which axially extending portion closely receives said pintle to lend non-bending support thereto, and said portion extends through the central aperture of said first race member, and said radially extending portion being substantially flat and free of shoulder means and providing a radially extending annular surface against which the end knuckle is engaged in supporting relation, and means on said axially extending portion of said second race member for maintaining said bearing means in assembly.

5. A ball bearing hinge according to either claim 2 or 4 wherein said means maintaining said raceways and bearings elements in assembly includes protuberance means radially extending from said axial extension and disposed between said first race member central aperture and said axial extention terminating end.

6. A ball bearing hinge according to claim 5, wherein said protuberance means comprises a retaining ring carried by said axial extension.

7. A ball bearing hinge according to claim 5, or in said protuberance means comprises a plurality of integral projections on said second race member axial extension.

* * * * *